No. 734,223. PATENTED JULY 21, 1903.
G. DINKEL.
PROCESS OF OBTAINING LIME SUCRATE.
APPLICATION FILED JAN. 19, 1903.
NO MODEL.
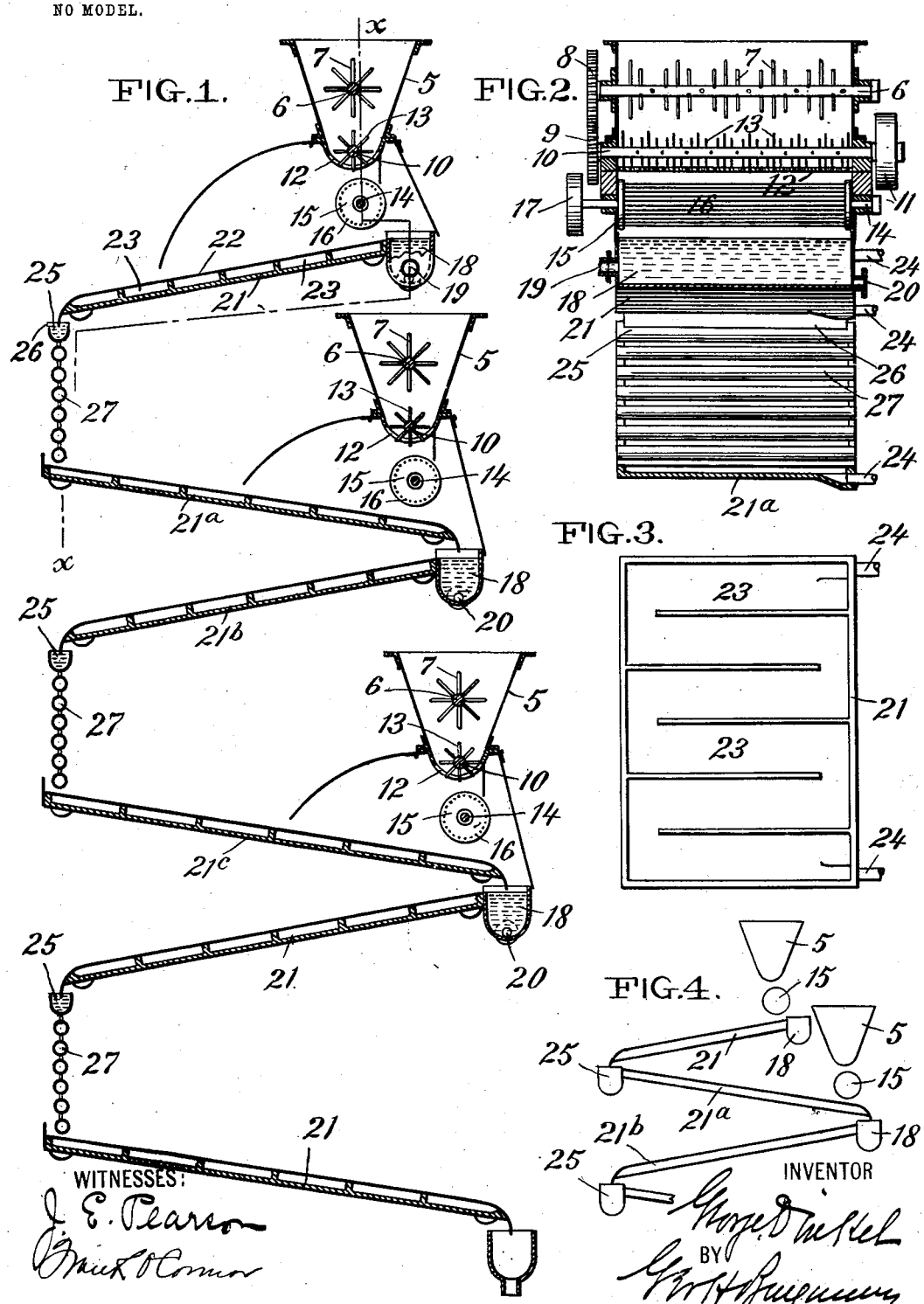

No. 734,223.

Patented July 21, 1903.

UNITED STATES PATENT OFFICE.

GEORGE DINKEL, OF JERSEY CITY, NEW JERSEY, ASSIGNOR TO THE AMERICAN SUGAR REFINING COMPANY, A CORPORATION OF NEW JERSEY.

PROCESS OF OBTAINING LIME SUCRATE.

SPECIFICATION forming part of Letters Patent No. 734,223, dated July 21, 1903.

Application filed January 19, 1903. Serial No. 139,551. (No specimens.)

*To all whom it may concern:*

Be it known that I, GEORGE DINKEL, a citizen of the United States, residing at Jersey City, county of Hudson, State of New Jersey, have invented a Process of Obtaining Lime Sucrate, of which the following is a specification.

My invention consists in a process of obtaining tricalcic sucrate from a solution of beet-molasses, water, and lime.

Theoretically forty-nine parts, by weight, of lime is required to combine with one hundred parts, by weight, of sugar contained in a solution of beet-molasses and water. This amount, however, is greatly exceeded in practice, owing to the fact that by reason of the imperfect method of introducing the lime into the solution and the apparatus employed the major portion of the lime is not brought into intimate contact with the sugar constituent of the solution, but is combined with the water present to form calcic hydrate. Hence it is necessary to use a large excess of lime. In experiments which I have made I have discovered that the amount of lime may be materially reduced and the evil effects of heating and foaming obviated if a definite quantity of the solution in the form of a thin flowing stream is subjected to the action of successive charges of lime distributed over its surface before being introduced into the main body of the solution. In other words, my improved process depends upon the fact that if small quantities of lime are successively introduced and distributed through a small body of the solution such lime will combine with the slightly-acid base of the sugar constituent to form tricalcic sucrate and that the amount of calcic hydrate formed will be very much less than that which would be produced were similar bodies of lime introduced into the main body of the solution or into a large quantity of water. I may further add that my improved process involves what may be termed a "time" element—that is, it contemplates the introduction of small bodies of lime into a thin flowing stream and permitting a period of time to elapse wherein the lime may combine with the slightly-acid base of the sugar before introducing a further quantity of lime. Stated in still other words, my experiments have shown me that if a considerable body of lime is introduced into a considerable body of the solution the lime will immediately combine with the water present in the solution to form calcic hydrate, whereas if small bodies of lime are successively introduced into small flowing bodies of the solution the lime is afforded a better opportunity to come in contact with the slightly-acid base of the sugar constituents of the solution.

To carry my invention into effect, I may make use of an apparatus such as shown in the accompanying drawings. I wish it understood, however, that any apparatus may be used through which my invention may be carried into effect.

Referring to the drawings, Figure 1 is a vertical section through such an apparatus as I may employ. Fig. 2 is a transverse section of my apparatus, taken approximately on the line X X of Fig. 1. Fig. 3 is a plan view of one of the cooling-plates. Fig. 4 is a vertical elevation, in diagrammatic form, showing a slight modification of the apparatus.

In the drawings, 5 represents a hopper. Arranged transversely of this hopper is a shaft 6, on which are a series of radial agitator-arms 7, which serve to stir up the pulverized material introduced into the hopper 5. On one end of the shaft 6 is a gear 8, in mesh with a corresponding gear 9 on the end of the shaft 10, arranged transversely of the lower portion of the hopper. On the opposite end of this shaft is a pulley 11. Through the bottom of the hopper, which is concave, is formed a series of parallel slots or openings 12, and arranged to move through these slots are the pins 13 on shaft 10. These pins serve to draw or push the pulverized material through the slots 12.

Located on a shaft 14, arranged transversely of the apparatus and immediately below the slots 12, is a drum 15, having its surface formed of a series of parallel wires 16. This drum when rotated serves to break up the streams of lime flowing through the slots 12 of the hopper 5. The rotation of this drum may be effected through the pulley 17. Situated under and to the right of the drum 15 is a trough 18, connected, through pipe 19, with the source of molasses solution.

20 indicates a pipe through which the solution may be drawn off from the trough to drain it.

Arranged to the left of the trough 18 and inclined in a downward direction from the top of the trough is a plate 21, having a continuous upper surface 22, made, preferably, of a good heat-conducting material and having its body portion divided into a series of channels 23. (Best shown in Fig. 3.) Connected to these channels are pipes 24, which may be connected to any source of cooling fluid. The object of constructing these plates with the channels through their body, as described, is to permit the circulation of a cooling fluid to extract any heat which may be generated over the surface of the plate.

Arranged under the lower edge of the plate 21 is a second smaller trough 25, perforated near the top at each side, as indicated at 26, and arranged under this trough are a series of parallel horizontally-disposed pipes 27. The object of this trough and pipes is to provide means for receiving the solution from the plate 21 and cooling it as it moves over the extended cooling-surface formed by the pipes 27. The pipes 27 may or may not be connected to a source of cooling fluid.

In Fig. 4 I have shown the same arrangement of parts, with the exception that the cooling apparatus is omitted.

In the drawings I have shown the plates 21 arranged with reversed inclinations. The object of this arrangement is to cause the solution to be, in effect, turned over and present different surfaces to the lime after each treatment by the lime.

The operation of my device is as follows: The lime is introduced into the hopper 5 and is gradually fed under the action of the pins 13 onto the revolving wire drum 15. Here the streams are broken up and deposited as a fine powder upon the solution flowing from the trough 18 onto the plate 21. It will be understood that the solution flows upon the plate in a thin stream. As the solution moves off the plate 21 it passes into the trough 25, thence over the cooling-pipes 27 onto the second plate 21ª, which exposes the opposite surface of the flowing solution. At the lower end of this plate it is again subjected to the action of a descending body of lime and from thence passes onto the plate 21ᵇ, thence to the plate 21ᶜ, where it is again subjected to the action of a body of descending lime, and so on.

In the drawings I have shown apparatus for subjecting the solution to three charges or three treatments with lime. I wish it understood that I do not limit myself to the number of treatments which the solution may receive.

It will be observed, as stated in the preamble of the specification, that a time interval elapses between the time of precipitation of the lime on the plate 21 and the precipitation of the lime on plate 21ª, and so on.

To carry my invention into practice, I propose to cause a stream of the molasses solution of definite width and thickness to be discharged upon a plate and a definite quantity of lime, measured through the instrumentalities described, to be continuously discharged on such stream as it passes under the drum 15. The thickness of the stream, its rapidity of flow, and the amount of lime added in a finely-divided state can readily be determined by experiment.

Having thus described my invention, I claim—

1. The herein-described process of forming calcic sucrate, which consists in causing a sugar-bearing solution to move as a thin stream over a series of plate-like surfaces and in adding to such stream at successive points in its line of travel lime in a finely-divided condition.

2. The herein-described process of forming calcic sucrate, which consists in introducing into a thin flowing stream of sugar-bearing solution successive charges of powdered lime.

3. The herein-described process of forming calcic sucrate, which consists in introducing into a thin flowing stream of sugar-bearing solution and at definite points in its line of travel successive charges of lime.

4. The herein-described process of forming calcic sucrate, which consists in causing a sugar-bearing solution to move as a thin stream over a series of plate-like surfaces, adding to such stream at successive points in its line of travel lime in a finely-divided condition, and cooling such stream in its passage over said surfaces.

5. The herein-described process of forming calcic sucrate, which consists in causing a sugar-bearing solution to move as a thin stream and at a definite rate of speed over a series of plate-like surfaces, and in adding to such stream at successive points in its line of travel measured quantities of lime in a finely-divided condition.

6. The herein-described process of forming calcic sucrate, which consists in causing a sugar-bearing solution to move as a thin stream at a definite rate of speed over a series of plate-like surfaces, and in distributing over the surface of said stream at successive points in its line of travel a definite quantity of lime in a finely-divided condition per unit of travel of said solution.

7. The herein-described process of forming calcic sucrate, which consists in causing a sugar-bearing solution to move as a thin extended stream over a series of plate-like surfaces, and in continuously adding to such stream at successive points in its line of travel lime in a finely-divided condition.

8. The herein-described process of forming calcic sucrate, which consists in causing a sugar-bearing solution to move as a thin stream over a series of plate-like surfaces, and to have its exposed surface reversed in passing from one plate to the next, and in adding to such stream first to one surface and then to the other at successive points in its line of travel lime in a finely-divided condition.

9. The herein-described process of forming calcic sucrate, which consists in adding to the sugar-bearing solution flowing as a thin stream and at successive points in its line of travel, and to alternately opposite surfaces of said stream, lime in a finely-divided condition.

10. The herein-described process of forming calcic sucrate, which consists in causing a sugar solution to move as a thin stream, depositing upon such stream a finely-divided body of lime, permitting said sugar solution and lime to move a definite distance, then adding a second body of lime, permitting said sugar solution and two charges of lime to move a definite distance, then adding a third charge of lime, repeating such additions of lime until combination has been effected between the sugar constituent of the solution and the added lime.

11. The herein-described process of forming calcic sucrate, which consists in causing a sugar solution to move as a thin stream, and in adding to such stream at successive points in its line of travel, charges of lime in a finely-divided condition, each charge in weight less than the quantity required to combine with the sugar constituent of the mass of sugar solution treated.

12. The herein-described process of forming calcic sucrate, which consists in causing a sugar solution to move as a thin stream, adding to such stream at successive points in its line of travel lime in a finely-divided condition, and cooling said solution between each addition of lime.

13. The herein-described process of forming calcic sucrate, which consists in causing a sugar solution to move as a thin stream, adding to said solution a definite quantity of lime in a finely-divided condition, allowing said bodies of sugar and lime to move in contact for a definite time, then adding a second body of lime, repeating the lime charges and periods of contact until the sugar of the treated solution has been precipitated by the chemical action of the lime.

14. The herein-described process of forming calcic sucrate, which consists in adding to a small and definite quantity of sugar solution a small and definite mass of lime in a finely-powdered condition, allowing such bodies to remain in contact for a definite length of time, then repeating said lime charges at intervals until the sugar contained in the treated solution has been precipitated by the chemical action of the lime.

15. The herein-described process of forming calcic sucrate, which consists in causing a sugar-bearing solution to move slowly over a plate-like surface, and in adding to a definite quantity of such solution, a definite quantity of lime within a definite time.

16. The herein-described process of forming calcic sucrate, which consists in causing a sugar-bearing solution to move as a thin stream over a plate-like surface, and adding to the surface of a definite quantity of such solution, a definite quantity of lime within a definite time.

17. The herein-described process of forming calcic sucrate, which consists in causing a sugar-bearing solution to move as a thin stream over a plate-like surface, and in adding to such stream, at the beginning of its line of travel, lime in a finely-divided condition.

18. The herein-described process of forming calcic sucrate, which consists in adding to a small and definite quantity of sugar solution, a small and definite mass of lime in a finely-divided condition, allowing said bodies to remain in contact for a definite length of time, then agitating said solution, then repeating said lime charges and agitation at intervals until the sugar contained in the treated solution has been precipitated by the chemical action of the lime.

In testimony whereof I affix my signature in the presence of two witnesses.

GEORGE DINKEL.

Witnesses:
J. E. PEARSON,
FRANK O'CONNOR.